United States Patent
Höhn et al.

(10) Patent No.: US 7,652,587 B2
(45) Date of Patent: Jan. 26, 2010

(54) MONITORING THE BEARING TEMPERATURE OF AN ELECTRICAL MACHINE

(75) Inventors: Ulrich Höhn, Hollstadt/Junkershausen (DE); Hans-Werner Lipot, Bad Neustadt (DE); Markus Platen, Bad Neustadt (DE)

(73) Assignee: Siemens Aktiengesellschaf, München (DE)

( * ) Notice: Subject to any disclaimer, the term of this patent is extended or adjusted under 35 U.S.C. 154(b) by 361 days.

(21) Appl. No.: 11/815,384

(22) PCT Filed: Jan. 31, 2006

(86) PCT No.: PCT/EP2006/050565

§ 371 (c)(1),
(2), (4) Date: Aug. 2, 2007

(87) PCT Pub. No.: WO2006/082190

PCT Pub. Date: Aug. 10, 2006

(65) Prior Publication Data

US 2008/0094231 A1    Apr. 24, 2008

(30) Foreign Application Priority Data

Feb. 2, 2005    (DE) .................. 10 2005 004 862

(51) Int. Cl.
  *G08B 21/00* (2006.01)
(52) U.S. Cl. .................. 340/682; 340/584; 340/514; 340/515; 340/589; 340/679; 701/29; 701/34; 701/31; 701/35; 318/139; 318/490
(58) Field of Classification Search ......... 340/514–515, 340/589, 584, 682; 73/862; 701/29, 31, 701/34, 35; 318/138–139, 439–490
See application file for complete search history.

(56) References Cited

U.S. PATENT DOCUMENTS

| | | | | | |
|---|---|---|---|---|---|
| 4,316,175 | A | * | 2/1982 | Korber et al. ........... | 246/169 A |
| 4,318,179 | A | * | 3/1982 | Kure-Jensen et al. ....... | 700/279 |
| 4,406,169 | A | * | 9/1983 | Ikeuchi et al. .......... | 73/862.541 |

(Continued)

FOREIGN PATENT DOCUMENTS

DE    41 38 066 A1    3/1992

(Continued)

*Primary Examiner*—Daniel Wu
*Assistant Examiner*—Son M Tang
(74) *Attorney, Agent, or Firm*—Henry M. Feiereisen; Ursula B. Day

(57) ABSTRACT

According to the method a temperature module is defined, simulating the thermal behavior in the electric motor (1), based on a multi-mass model. The rotational speed (n) and the current (i) for the electric motor (1) are continuously recorded as input parameters for the temperature model and at least one bearing power loss and/or bearing inner temperature (TIL1'), corresponding to a bearing (8,9), is continuously derived from the temperature model. A first warning signal (W1) is given when a computer-determined bearing power loss exceeds a given comparative value. Furthermore, a second warning signal (W2) is given when a computer-determined bearing inner ring temperature exceeds a given temperature difference (ΔT) from a corresponding computed bearing outer ring temperature (TAL1'). The thermal behavior of non-accessible components, in particular, the bearing (8, 9), can thus advantageously be determined by mere evaluation of the current (i) and the rotational speed (n). The fitting of temperature sensors (2, 3, 4, 12) in the electric motor (1) can also be avoided.

19 Claims, 2 Drawing Sheets

U.S. PATENT DOCUMENTS

| | | | | |
|---|---|---|---|---|
| 5,103,335 | A | * | 4/1992 | Sugiura .................... 359/212.1 |
| 5,381,692 | A | * | 1/1995 | Winslow et al. ................ 73/593 |
| 5,599,112 | A | * | 2/1997 | Klein ......................... 384/624 |
| 5,633,628 | A | * | 5/1997 | Denny et al. ................. 340/584 |
| 6,014,598 | A | * | 1/2000 | Duyar et al. .................... 701/29 |
| 6,053,047 | A | * | 4/2000 | Dister et al. .................... 73/593 |
| 6,161,962 | A | * | 12/2000 | French et al. ............... 384/459 |
| 6,236,328 | B1 | * | 5/2001 | Smith et al. ................. 340/682 |
| 6,297,742 | B1 | * | 10/2001 | Canada et al. .............. 340/635 |
| 6,321,602 | B1 | * | 11/2001 | Ben-Romdhane ............ 73/660 |
| 6,360,616 | B1 | * | 3/2002 | Halliday et al. .......... 73/862.49 |
| 6,646,397 | B1 | * | 11/2003 | Discenzo ................ 318/400.07 |
| 6,711,952 | B2 | * | 3/2004 | Leamy et al. ................. 73/579 |
| 6,714,135 | B2 | * | 3/2004 | Froman et al. .............. 340/682 |
| 6,834,256 | B2 | * | 12/2004 | House et al. ................. 702/181 |
| 7,097,351 | B2 | * | 8/2006 | Lancon et al. .................. 374/4 |
| 7,135,830 | B2 | * | 11/2006 | El-Ibiary .................... 318/561 |
| 7,291,999 | B2 | * | 11/2007 | Huang ........................ 318/563 |
| 7,308,322 | B1 | * | 12/2007 | Discenzo et al. ................ 700/28 |
| 7,435,004 | B2 | * | 10/2008 | Singh et al. ................. 384/448 |
| 7,448,853 | B2 | * | 11/2008 | Mabe et al. ..................... 416/1 |
| 2002/0105429 | A1 | * | 8/2002 | Donner et al. .............. 340/682 |
| 2004/0036621 | A1 | * | 2/2004 | Morita et al. ............... 340/682 |

FOREIGN PATENT DOCUMENTS

| | | |
|---|---|---|
| DE | 103 05 368 A1 | 8/2004 |
| DE | 103 07 708 A1 | 9/2004 |
| EP | 1 450 460 A2 | 8/2004 |

* cited by examiner

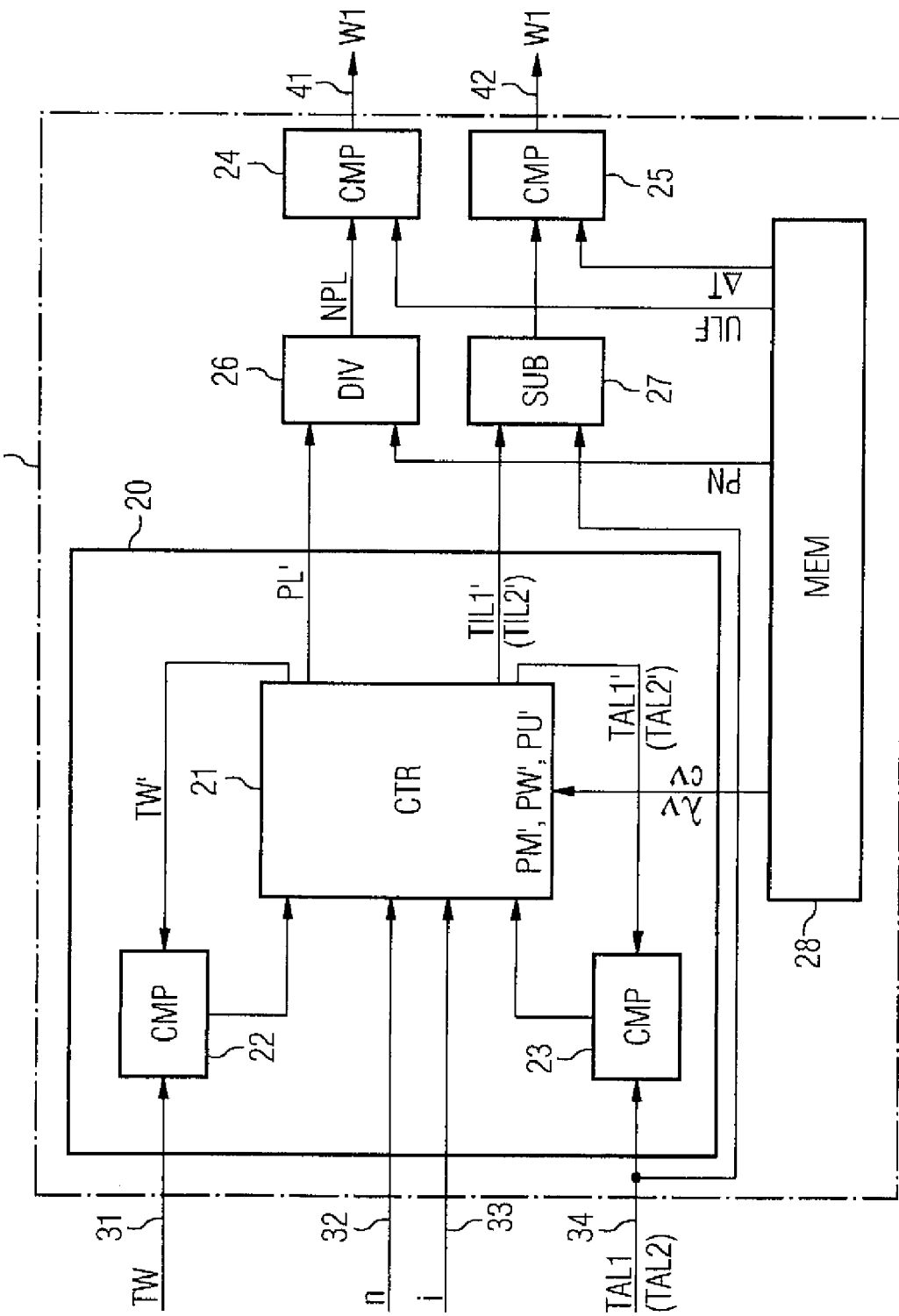

MONITORING THE BEARING TEMPERATURE OF AN ELECTRICAL MACHINE

BACKGROUND OF THE INVENTION

A method for monitoring the temperature of at least one bearing of an electrical machine, a monitoring device which corresponds to it, as well an electrical machine having a monitoring device such as this.

The present invention relates to a method for monitoring the temperature of at least one bearing of an electrical machine, such as a motor or a generator, which has a plurality of components such as a stator, a rotor and windings. The present invention also relates to a corresponding monitoring device, and to an electrical machine having a monitoring device such as this.

DE 103 05 368 A1 discloses methods and apparatuses in which relevant components of the electrical machine are monitored, effectively in real time, by an evaluation apparatus by means of temperature sensors which operate without making contact.

It is also known that the bearings of an electrical machine are subject to severe fatigue and/or to severe wear, in particular, when the electrical machine is excessively heavily loaded. This can lead to failure of the bearing and, in the end, of the electrical machine.

In addition, an excessively high temperature difference between the outer and inner part of the bearing, the so-called bearing outer ring and the so-called bearing inner ring, can result in the bearing becoming jammed, as a result of thermal stresses. Temperature differences such as these, in particular of a value of more than about 80° C., lead to severely accelerated wear and in consequence to rapid failure of the bearing or of the entire electrical machine. The reason for such high temperature differences is a high thermal power loss which is caused by remagnetization processes in the rotor and which can be dissipated from the rotor only with difficulty.

It is admittedly also possible, as described in DE 103 05 368 A1, for the temperature of rotating components, for example of the rotor, to be detected without contact being made. However, the extremely confined spatial conditions in a compact electrical machine do not allow reliable measured-value detection.

SUMMARY OF THE INVENTION

One object of the invention is therefore to specify a method and a monitoring device which allow accurate detection of the bearing temperatures, even at points within the electrical machine which are difficult to access for measurement purposes.

A further object of the invention is to specify an electrical machine which is suitable for this purpose.

The object of the invention is achieved as follows: a temperature model is predetermined and simulates the thermal conditions in the electrical machine on the basis of a multiple-mass model. The rotation speed and the current of the electrical machine are detected continuously as input variables for the temperature model, and at least one bearing power loss, which corresponds to a bearing, and/or a bearing inner ring temperature are/is derived continuously from the temperature model. A first warning message is emitted if a bearing power loss determined by calculation is greater than a predeterminable comparison value. Furthermore, a second warning message is emitted if a bearing inner ring temperature determined by calculation exceeds a predeterminable temperature difference with respect to an associated calculated bearing outer ring temperature.

This is linked to the major advantage that the thermal conditions for components to which access is difficult, in particular those of the bearing, can be determined solely by evaluating the current and the rotation speed of the electrical machine, which are already available for electrical machine control purposes. There is advantageously also no need to fit temperature sensors in the electrical machine. Once a warning has been issued when predeterminable critical bearing power losses and critical bearing temperatures have been exceeded, the relevant bearing can be replaced at a time which is suitable from the operating point of view. This avoids the failure of the electrical machine and, possibly, of an installation that is connected to it.

In particular, a winding power loss, a magnetization power loss and a thermal emitted power as well as the bearing power loss associated with the components of the electrical machine are derived as a function of the rotation speed and current, from the temperature model. In particular, the thermal conductivities, the specific thermal capacities, the electrical conductances and the magnetic loss factor of the respective components of the electrical machine are stored in the temperature model. These material-dependent parameters may, for example, be determined by measurement in trials, or may be derived from a suitable CAD system. This advantageously allows the method to be applied to different types of electrical machines by varying the material-dependent parameters.

More accurate local temperature determination and more accurate determination of the bearing power loss are advantageously possible by detecting at least one winding temperature as a further input variable for the temperature model. For this purpose, the respective bearing power loss and/or the thermal emitted power to the surrounding area are/is simulated in the temperature model in such a way that the winding temperature, determined by calculation, matches a corresponding winding temperature as closely as possible. The temperature model is advantageously readjusted by means of such control. Normally it is sufficient to assume a constant ambient temperature to which the thermal power losses are emitted. For more stringent requirements, it is also possible to detect the ambient temperature.

Furthermore, in order to improve the accuracy, at least one bearing outer ring temperature can be detected as a further input variable for the temperature model. For this purpose, the respective bearing power loss and/or the thermal emitted power are/is simulated in the temperature model in such a way that the bearing outer ring temperature determined by calculation matches the corresponding detected bearing outer ring temperature as closely as possible.

The bearing power loss determined by calculation can also be normalized with respect to a rated power loss. This results in a simpler comparison capability, particularly when the normalized bearing power loss is compared with a predeterminable overload factor. For this purpose, the overload factor can advantageously be specified as percentage values.

The overload factor is preferably at least 30%, so that sufficiently accurate definition of bearing wear is possible while maintaining an advance-warning time prior to replacement of the bearing that is still adequate.

The predeterminable temperature difference between the bearing ring outer temperature and the bearing ring inner temperature is preferably at least 80° C. Once again, this allows the bearing wear to be defined sufficiently accurately to ensure that there is still sufficient advance-warning time before replacement of the bearing.

The method according to the invention can advantageously be carried out by calculation, by means of functional units of a monitoring device, such as a computation unit, subtractor, divider, comparator and memory. Functional units such as these may be in the form of an integrated circuit, in particular an application-specific integrated circuit. An application-specific integrated circuit such as this may, for example, be a microcontroller or a PLD (programmable logic device).

An electrical machine preferably has a monitoring device such as this in order to monitor the bearing temperature. The compact design allows it to be accommodated, for example, in the electrical connection area of the electrical machine.

The monitoring device is suitable for electrical machines with an electrical power of at least 1 kW. In some circumstances, it will be quicker and financially better to replace the entire electrical machine in the case of electrical machines in a power range below this.

BRIEF DESCRIPTION OF THE DRAWING

The invention will be explained in more detail with reference to the attached figures, in which:

FIG. 2 shows an example of a functional block diagram of a monitoring device for carrying out the method according to one embodiment.

DETAILED DESCRIPTION OF PREFERRED EMBODIMENTS

Figure 1:
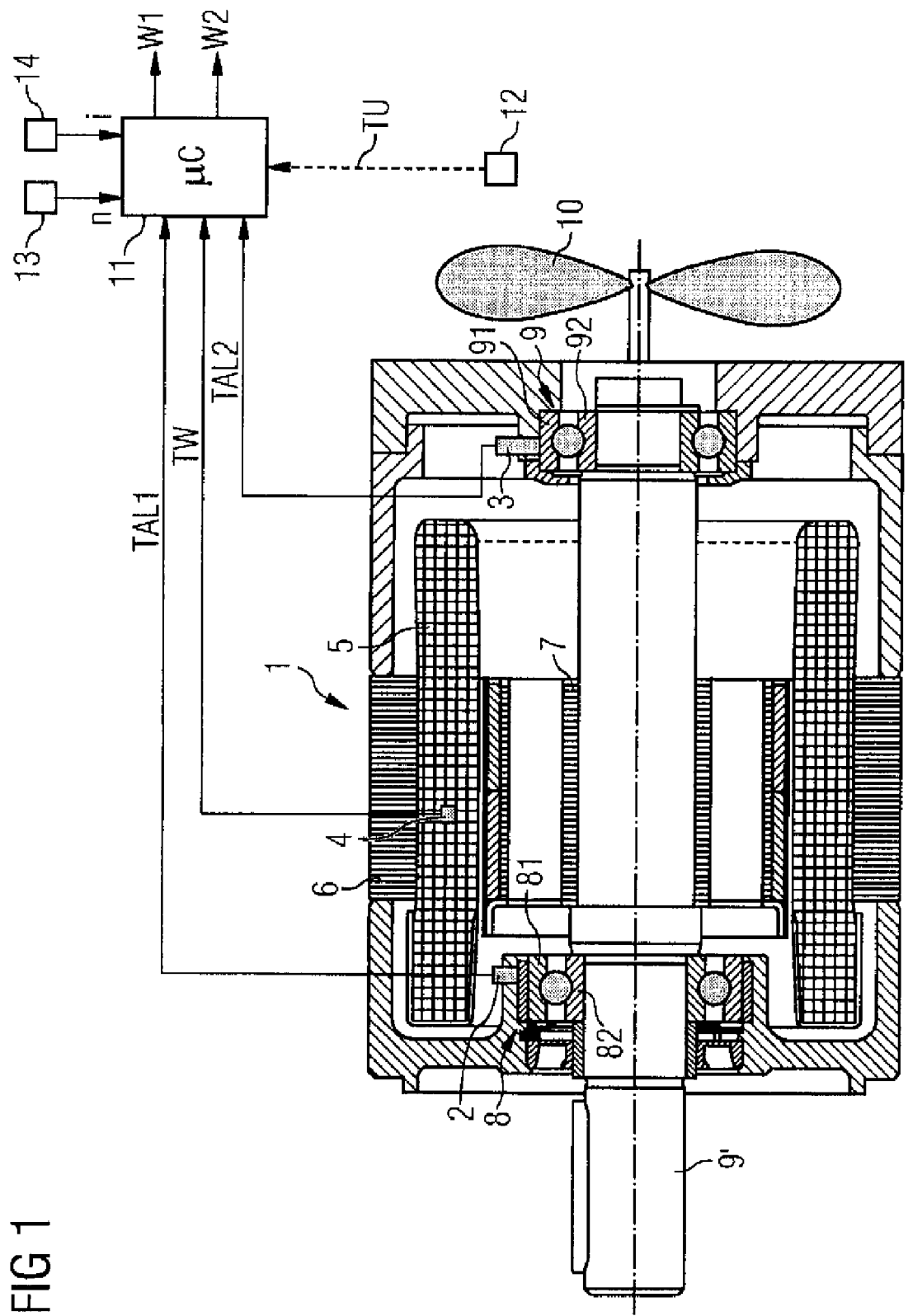
FIG. 1 shows a longitudinal section through an electrical machine, which is illustrated by way of example, as well as an example of a monitoring apparatus, which is already connected to temperature sensors of the electrical machine according to one embodiment of the invention, and\

FIG. 1 shows a longitudinal section through an illustrated example of an electrical machine 1, as well as an example of a monitoring apparatus 11, which is already connected to temperature sensors 2, 3, 4 for detecting, for example, two bearing outer ring temperatures TAL1, TAL2 as well as a winding temperature TW of the electrical machine 1. In this case, by way of example, the electrical machine 1 may be a motor or else a generator. The longitudinal section also shows a rotor 7 with a shaft 9' as well as a stator 6 with a winding 5. By way of example, a fan 10 is fitted on the shaft 9', and cools the electrical machine 1 as a function of its rotation speed n. The shaft 9' of the electrical machine 1 is mounted via two bearings 8, 9. The reference symbols 81, 91 denote the bearing outer ring, while the reference symbols 82, 92 denote the bearing inner ring of the respective bearing 8, 9. The two temperature sensors 2, 3 are used to detect the respective bearing outer ring temperature TAL1, TAL2. These are therefore placed as close as possible to the respective bearing outer ring 81, 82. A further temperature sensor 4, for detecting the winding temperature TW, is fitted in the winding 5. In the example in the figure, a temperature sensor 12 for detecting the ambient temperature TU is shown by dashed lines. As described initially, there is no need for this temperature sensor 4 in many cases.

The example of a monitoring device 11 according to the invention is also linked to a tachometer 13 and to an ammeter 14 for detecting the rotation speed n and the current i of the electrical machine 1. As described initially, these are used to determine the load level on the electrical machine 1, and the thermal power introduced into it in consequence. W1 and W2 denote the first and second warning messages, which are emitted if the maximum permissible bearing power loss values are exceeded and if the maximum permissible temperature difference between the bearing outer ring 81, 82 and the bearing inner ring 91, 92 is exceeded.

FIG. 2 shows an example of a functional block diagram of a monitoring device 11 for carrying out the method according to one advantageous embodiment. For this purpose, the monitoring device 11 has functional units such as a computation unit 21, a subtractor 27, a divider 26, comparators 24, 25 and a memory 28. A modeling unit 20 which, inter alia, has the computation unit 21 as well as the comparators 22, 23, is used for calculation of the temperature model of the electrical machine 1. The computation unit 21 is connected via the electrical inputs 32, 33 of the monitoring device 11 to the tachometer 13 in order to detect the rotation speed n, and is connected to the ammeter 14 in order to detect the current i. The computation unit 21 continuously determines the power losses mentioned initially from these two variables n, i. These are the magnetization power loss PM', the winding power loss PW', the thermal emitted power PU' to the surrounding area and by way of example—for better understanding—only one bearing power loss PL'. The reference symbols TAL2, TAL2', TIL2' associated with the second bearing 9 are thus placed in brackets. Furthermore, the computation unit 21 continuously determines a bearing inner ring temperature TIL1' associated with the bearing 8, a bearing outer ring temperature TAL1' and a winding temperature TW'.

According to the invention, the winding temperature TW' determined by calculation and the bearing outer ring temperature TAL1' determined by calculation are supplied to a respective comparator 22, 23, and these comparators 22, 23 compare the temperatures TW', TAL' determined by calculation with the measured temperatures TW, TAL1. For this purpose, the associated temperature sensors 2, 4 are connected via the electrical inputs 31, 34 to the respective comparators 22, 23. The respective comparison result is then supplied to the computation unit 21 again. The computation unit 21 acts, so to speak, as a regulator, which attempts to minimize the comparison values by readjusting the determined bearing power loss PL' and the thermal emitted power to the surrounding area PU'.

Furthermore, the monitoring device 11 preferably has an electronic memory 28 from which the computation unit 21 can download the machine-specific and the material-specific values, such as the thermal conductivity coefficients $\lambda v$ and specific thermal capacities cv for the purpose of forming the model.

According to the invention, the bearing power loss PL', which is determined by calculation and is readjusted, is compared with a predeterminable comparison value. Previously, the bearing power loss PL' has been normalized with respect to a rated power loss PN by means of a divider 26. This normalized bearing power loss NPL is, finally, compared with an overload factor ULF by means of a comparator 24. If exceeded, the comparator 24 produces the first warning message W1, which is then produced at the electrical output 41 for further evaluation.

In parallel with this, a subtractor 27 forms the difference between the bearing inner ring temperature TIL1', determined by calculation, and the preferably measured bearing outer ring temperature TAL1. Alternatively, it is also possible to use the bearing outer ring temperature TAL' determined by calculation for subtraction purposes, rather than the measured bearing outer ring temperature TAL1. The determined temperature difference is then compared with a predeterminable temperature difference $\Delta T$. If exceeded, the comparator 25 then produces the second warning message W2, which is produced at the electrical output 42 for further evaluation.

What is claimed is:

1. A method for monitoring a temperature of at least one bearing of an electric machine which has a plurality of machine components, comprising the steps of:
    defining a temperature model for the machine,
    simulating thermal conditions in the electric machine based on a multiple-mass model,
    continuously measuring an electric current in the electric machine and supplying the measured electric current as an input variable for the temperature model, continuously measuring a rotation speed of the electric machine as an input variable for the temperature model, deriving from the temperature model at least one calculated bearing power loss, which corresponds to a temperature of a bearing or a temperature of a bearing inner ring, emitting a first warning message if the calculated bearing power loss is greater than a predetermined comparison value, or emitting a second warning message if a calculated temperature difference between a bearing inner ring and an associated bearing outer ring exceeds a predetermined temperature difference, or both.

2. The method of claim 1, further comprising the step of deriving, with the temperature model, as a function of the rotation speed and the electric current a winding power loss associated with the machine components, a magnetization power loss and a thermal emitted power as well as the at least one bearing power loss.

3. The method of claim 2, further comprising the steps of measuring at least one winding temperature as an additional input variable for the temperature model, and simulating the respective bearing power loss or the at least one thermal emitted power, or both, with the temperature model so as to closely match a calculated winding temperature with a corresponding measured winding temperature.

4. The method of claim 1, further comprising the steps of measuring at least one bearing outer ring temperature as a further input variable for the temperature model, and simulating the respective bearing power loss or the at least one thermal emitted power, or both, with the temperature model so as to closely match a calculated bearing outer ring temperature with a corresponding measured bearing outer ring temperature.

5. The method of claim 1, further comprising the step of measuring ambient temperature as an input variable for the temperature model.

6. The method of claim 1, wherein the ambient temperature is assumed to be constant during measurements.

7. The method of claim 1, further comprising the step of normalizing the at least one calculated bearing power loss with respect to a rated power loss of a bearing.

8. The method of claim 7, wherein the normalized bearing power loss is compared with a predetermined overload factor.

9. The method of claim 8, wherein the overload factor is at least 30%.

10. The method of claim 1, wherein the predetermined temperature difference between the bearing outer ring and the bearing inner ring is at least 80° C.

11. The method of claim 1, wherein the machine components are selected from the group consisting of stator, a rotor, and windings.

12. A monitoring device for monitoring a temperature of at least one bearing of an electric machine which has a plurality of machine components, said monitoring device comprising:

at least one electric input for receiving an input signal from an current measuring device, at least one input signal from a tachometer for measuring a rotation speed of the electric machine, at least one electric input for receiving an input signal from at least one temperature sensor for measuring a winding temperature or at least one bearing outer ring temperature of the electric machine, at least one electric output for emitting at least one of a first and a second warning message, and at least one functional unit selected from the group consisting of computation unit, a subtractor, a divider, comparator and electronic memory for carrying out the method of claim 1.

13. The monitoring device of claim 12, wherein the at least one electric input receives an input signal from a temperature sensor configured to detect an ambient temperature.

14. The monitoring device of claim 12, wherein the at least one functional unit is preset to a constant ambient temperature.

15. The monitoring device of claim 12, wherein the at least one functional unit comprises an integrated circuit.

16. The monitoring device of claim 15, wherein the integrated circuit comprises an application-specific integrated circuit (ASIC).

17. An electric machine with a monitoring device of claim 12 for monitoring a temperature of at least one bearing of the electric machine.

18. The electric machine of claim 17, wherein the electric machine has an electric power rating of at least 1 kW.

19. The electric machine of claim 17, wherein the machine components are selected from the group consisting of stator, a rotor, and windings.

* * * * *